United States Patent [19]

Gellert

[11] Patent Number: 5,051,086
[45] Date of Patent: Sep. 24, 1991

[54] INSULATED INJECTION MOLDING NOZZLE

[76] Inventor: Jobst U. Gellert, 7A Prince Street, Georgetown, Ontario, Canada, L7G 2X1

[21] Appl. No.: 576,858

[22] Filed: Sep. 4, 1990

[30] Foreign Application Priority Data

Jul. 27, 1990 [CA] Canada .................................. 2022124

[51] Int. Cl.$^5$ ............................................. B29C 45/20
[52] U.S. Cl. ................................ 425/549; 264/328.15; 425/568
[58] Field of Search ............... 425/547, 549, 562, 568, 425/569, 570, 588; 264/297.2, 328.8, 328.14, 328.15; 219/301, 421

[56] References Cited

U.S. PATENT DOCUMENTS

| | | | |
|---|---|---|---|
| 4,238,671 | 12/1980 | Gellert | 219/421 |
| 4,687,613 | 8/1987 | Tsutsumi | 425/549 |
| 4,837,925 | 6/1989 | Gellert | 425/549 |
| 4,865,535 | 9/1989 | Gellert | 425/549 |
| 4,911,636 | 3/1990 | Gellert | 425/549 |
| 4,922,082 | 5/1990 | Bredt et al. | 425/549 |

Primary Examiner—Timothy Heitbrink
Attorney, Agent, or Firm—Dalesman & Company

[57] ABSTRACT

An insulated injection molding nozzle having several alternating layers of stainless steel and ceramic insulating material surrounding an integral spiral electrical heating element. The coils of the heating element are wound around a central cylindrical portion of the body of the nozzle extending between larger diameter rear and forward collar portions. The alternating layers are plasma sprayed over the coil from a thin inner stainless steel layer to a thick outer stainless steel layer. The heating element and an outer shoulder portion are vacuum brazed in two stages to provide a completely integral structure.

8 Claims, 2 Drawing Sheets

INSULATED INJECTION MOLDING NOZZLE

BACKGROUND OF THE INVENTION

This invention relates generally to injection molding, and more particularly to an injection molding nozzle having an integral electrical heating element surrounded by layered ceramic insulation.

Injection molding nozzles having integral spiral electrical heating elements are well known. For instance, the applicant's U.S. Pat. No. 4,238,671 which issued Dec. 9, 1980 shows a helical electrical heating element cast into a conductive material around a high strength corrosion resistant inner core portion. More recently, the applicant's U.S. Pat. No. 4,865,535 which issued Sept. 12, 1989 shows a nozzle in which the heating element has a multiple thickness extending into a tapered nose portion. As shown in both of these patents, it is also well known to provide insulation between the heated nozzle and the surrounding cavity plate by having an insulative air space between them.

With the development of smaller sized injection molding components and the increased demand for more temperature critical materials, the relationship of heating, cooling and insulation in injection molding systems has become even more critical to successful operation. This is particularly true for systems using temperature assisted or thermal gating. An example of thermal gating using cooling is shown in U.S. Pat. No. 4,687,613 to Tsutsumi which issued Aug. 18, 1987. Examples using heating are shown in the applicant's U.S. Pat. No. 4,911,636 which issued Mar. 27, 1990 and U.S. Pat. No. 4,922,082 to Bredt et al. which issued May 1, 1990. The length of cycle time is also a factor which is critical to the successful operation of these systems. Thus, temperature time response as well as location of the heating and cooling relative to the gate is very important. While these previous nozzles are satisfactory for many applications, in addition to thermal conductivity problems, some of them have the disadvantages that they are relatively costly to make and the location of the heating or cooling elements adjacent the gate structurally weakens them.

SUMMARY OF THE INVENTION

Accordingly, it is an object of the present invention to at least partially overcome the disadvantages of the prior art by providing an injection molding nozzle having an integral spiral heating element surrounded by alternating layers of steel and insulating material.

To this end, in one of its aspects, the invention provides an elongated injection molding nozzle to be seated in a bore in a cooled cavity plate, the nozzle having a body with a forward end, a rear end and a melt bore extending therethrough to convey melt from an inlet at the rear end to a gate leading to a cavity, the nozzle having an electrically insulated heating element with a spiral portion having coils which is integrally brazed to extend concentrically around at least a portion of the melt bore, the improvement wherein the spiral portion of the heating element is surrounded by a plurality of layers of steel alternating with a plurality of layers of insulating material, the layers of steel including an outer layer and an inner layer which is sprayed over an outer portion of the coils of the spiral portion of the heating element, the layers of steel other than the inner layer each being sprayed over an inner adjacent one of the layers of insulating material, the layers of insulating material each being sprayed over an inner adjacent one of the layers of steel.

Further objects and advantages of the invention will appear from the following description, taken together with the accompanying drawings.

DETAILED DESCRIPTION OF THE DRAWINGS

Figure 1:
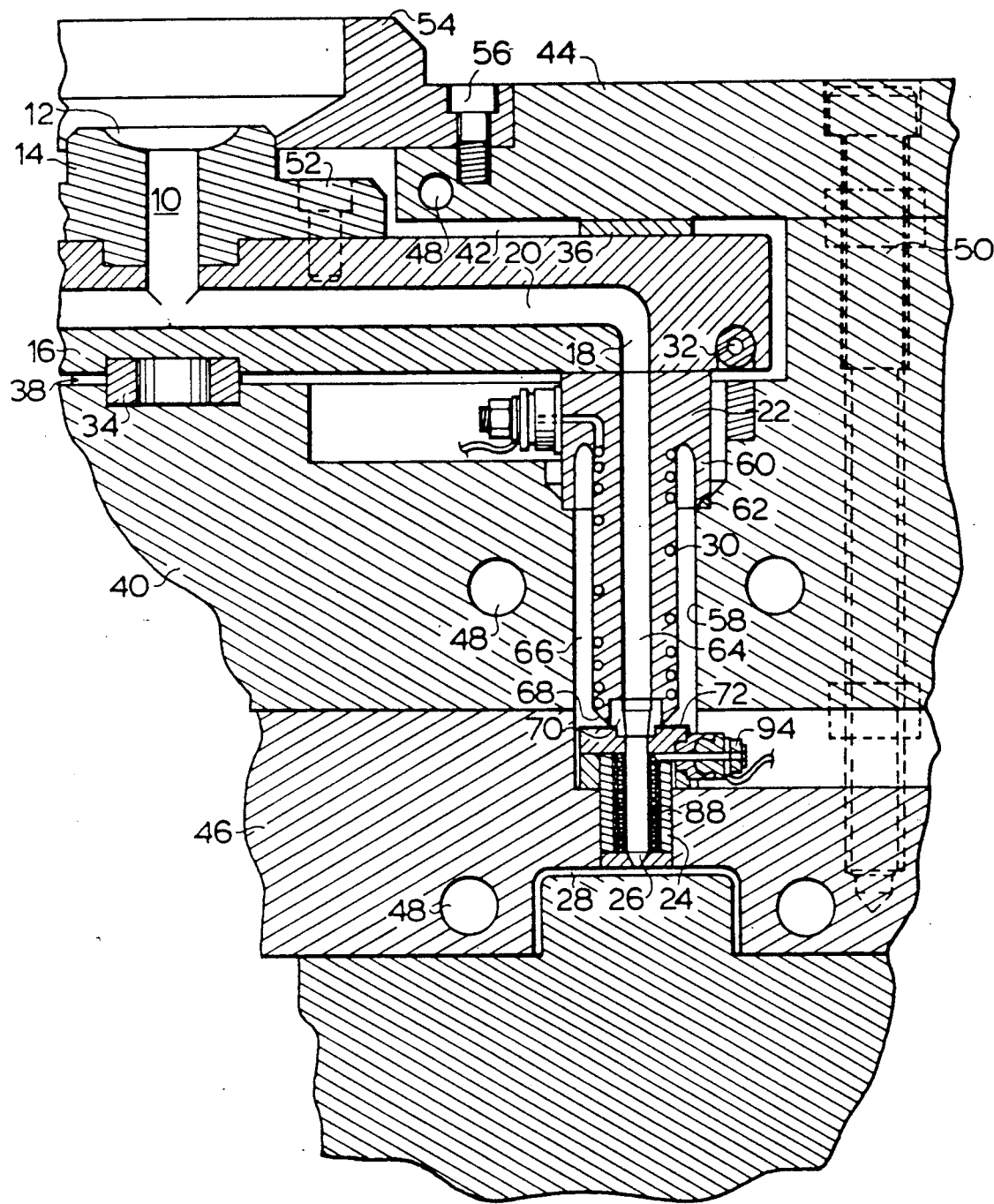
FIG. 1 is a sectional view of a portion of an injection molding system showing a nozzle according to a preferred embodiment of the invention.

Reference is first made to FIG. 1 which shows a portion of a multi-cavity injection molding system. A melt passage 10 extends from a common recessed inlet 12 in a manifold extension 14 to an elongated manifold 16 where it branches out to a number of outlets 18. As can be seen, each branch 20 of the melt passage extends through a rearward nozzle 22 and a forward nozzle 24 to a gate 26 leading to each cavity 28. The rearward nozzle 22 is a conventional nozzle with an integral spiral electrical heating element 30, and the forward nozzle 24 is a heated nozzle according to a preferred embodiment of the invention as described in greater detail below with reference to FIG. 2.

The elongated manifold 16 is heated by a heating element 32 which is integrally brazed into it. The manifold 16 is held in place by a central locating ring 34 and insulating pressure pads 36. The locating ring bridges an insulative air space 38 between the heated manifold 16 and a cooled spacer plate 40. The pressure pads 36 provide another insulative air space 42 between the heated manifold 16 and a cooled clamp plate 44. The spacer plate 40, clamp plate 44 and the cavity plate 46 are cooled by pumping cooling water through cooling conduits 48. The clamp plate 44 and spacer plate 40 are secured in place by bolts 50 which extend into the cavity plate 46. The manifold extension 14 is held in place by screws 52 and a locating collar 54 which is secured to the clamp plate 44 by screws 56.

Each rearward nozzle 22 is seated in a well 58 in the spacer plate 40. It is located by an insulation flange 60 seated on a circumferential shoulder 62 with a central melt bore 64 aligned with one of the melt passage outlets 18 from the manifold 16. This also provides another insulative air space 66 between the heated nozzle 22 and the surrounding cooled spacer plate 40. In this embodiment, the forward end 68 of the rearward nozzle 22 has a gate insert 70 which is also seated in the rear end 72 of the forward nozzle 24.

Figure 2:
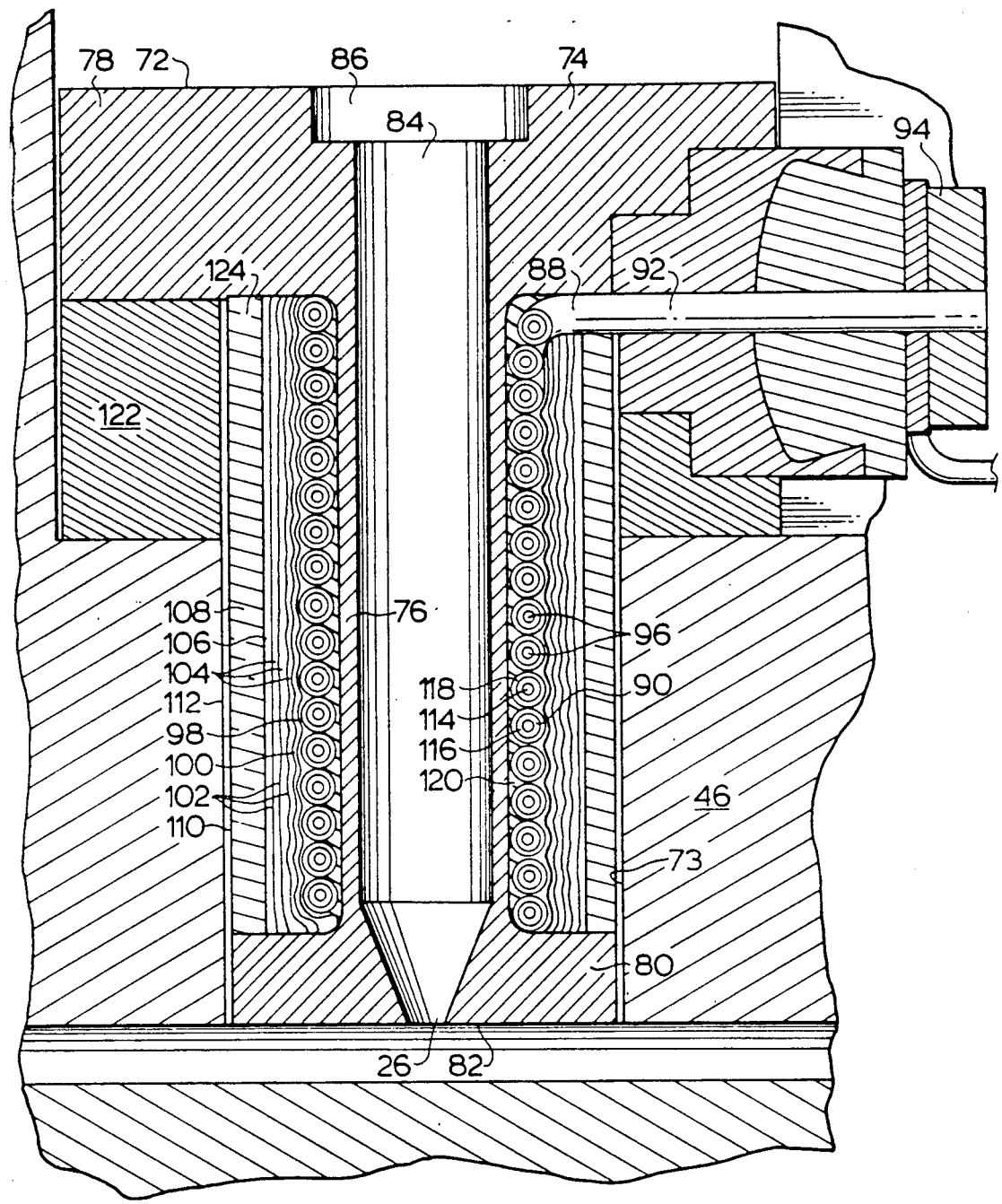
FIG. 2 is an enlarged sectional view showing the same nozzle.

Reference is now made to FIG. 2 to describe in detail the forward nozzle 24 according to a preferred embodiment of the invention which is received in a matching bore 73 in the cavity plate 46. It has a steel body 74 with a central cylindrical portion 76 extending between a larger diameter collar portion 78 at the rear end 72 and a larger diameter collar portion 80 at the forward end 82. The body 74 also has a melt bore 84 which extends centrally therethrough from an inlet 86 at the rear end 72 which is aligned with the melt bore 64 of the rearward nozzle 22 to the gate 26 at the forward end 82. An electrical heating element 88 has a spiral portion 90 and a radial portion 92 which extends outwardly to a cold terminal 94 as described in the applicant's U.S. Pat. No.

4,837,925 which issued June 13, 1989. The spiral portion 90 is cylindrical shaped with the coils 96 wound adjacent each other around the central cylindrical portion 76 of the body 74. The nozzle 24 also has a thermocouple (not shown) to measure the operating temperature. In this embodiment it is seated in a hole (not shown) which is drilled radially inward in the body 74 adjacent the cold terminal to nearly reach the spiral portion 90 of the heating element 88. In other embodiments, the thermocouple may be located further forward to be closer to the area of the gate 26.

The coils 96 of the heating element 88 are first covered by a thin inner layer 98 of stainless steel which is plasma sprayed over them. The inner layer 98 of stainless steel is then covered by a layer 100 of ceramic insulating material such as alumina oxide which is plasma sprayed over it. As seen in FIG. 2, this is followed by several layers of stainless steel 102 and ceramic insulating material 104 which are alternately plasma sprayed over each other. In this embodiment, the layers of stainless steel 102 are approximately 0.002 inches thick and the layers of ceramic insulating material 104 are approximately 0.010 inches thick, although other suitable thicknesses can be used. It has been found that making the layers of ceramic insulating material 104 thicker than 0.020 inches when alumina oxide is used results in unacceptable cracking. This is avoided by using alternating layers of stainless steel and alumina oxide. The outer layer 106 of ceramic insulating material is covered by a thick layer 108 of stainless steel which is plasma sprayed over it. In this embodiment, the thick outer layer 108 of stainless steel is approximately 0.050 inches thick, although other suitable thickness can be used. Finally, the thick outer layer 108 has a plasma sprayed nickel coating 110 which can be machined to provide a finished cylindrical outer surface 112.

In this embodiment, the heating element 88 has a nickel-chrome resistance wire 114 extending centrally through a refractory powder electrical insulating material such as magnesium oxide 116 inside a steel casing 118. The coils of the heating element 88 are integrally cast in a nickel alloy 120 by a first brazing step in a vacuum furnace. As described in the applicant's U.S. Pat. No. 4,911,636 referred to above, brazing in a vacuum furnace will result in the nickel alloy flowing by capilliary action into all of the spaces around the coils 96 inside the inner layer of stainless steel 98 and metallurgically bonding to the steel casing 118 of the coils 96 and the central portion 76 of the body 74. This produces very efficient and uniform heat transfer from the coils 96 to the central portion 76 of the body 74 around the central melt bore 84.

A hollow cylindrical collar or shoulder portion 122 is then mounted over a rear portion 124 of the coated outer layer of stainless steel 108 adjacent the rear collar portion 78. The shoulder portion 122 is then integrally brazed in place by a second brazing step of applying a copper-nickel brazing paste and heating in a vacuum furnace. The shoulder portion 122 is made with a groove (not shown) to receive the radial portion 92 of the heating element 88 and both the rear collar portion 78 and the shoulder portion 122 are shaped to receive the electrical terminal 94 when they are joined together.

In use, after the injection molding system has been assembled as shown in FIG. 1, electrical power is applied to the heating elements 30, 32 and 88 to heat the manifold 16 and the rearward and forward nozzles 22,24 to a predetermined operating temperature. Hot pressurized melt is then introduced into the melt passage 10 through the recessed inlet 12 from a molding machine (not shown) according to a predetermined cycle. The melt branches in the manifold 16 and flows through the melt bores 64 and 84 of each rearward and forward nozzle 22,24 to the gate 26 and fills the cavity 28. After the cavities 28 are full, injection pressure is held momentarily to pack and then released. When temperature assisted or thermal gating is used, the electrical power to the heating element 88 is controlled so that no heat is provided for a short period of time before and when the mold is opened which freezes the gate 26. After a short cooling period, the mold is opened to eject the container. Shortly after the mold is opened, electrical power is reapplied to the heating element 88 to start melting the cold plug so the gate reopens when injection pressure is reapplied after the mold is closed following ejection. This precise cycle is repeated continuously with a frequency dependent on the size and shape of the cavity and the type of material being molded.

While the description of the insulted injection molding nozzle according to the invention has been given with respect to a particular embodiment, it is not to be construed in a limiting sense. Variations and modifications will occur to those skilled in the art. In particular, it is apparent that the composition, number and thickness of the layers 102,104 can be different for different applications. Reference is made to the attached claims for a definition of the invention.

What I claim is:

1. In an elongated injection molding nozzle to be seated in a bore in a cooled cavity plate, the nozzle having a body with a forward end, a rear end and a melt bore extending therethrough to convey melt from an inlet at the rear end to a gate leading to a cavity, the nozzle having an electrically insulated heating element with a spiral portion having coils which is integrally brazed to extend concentrically around at least a portion of the melt bore, the improvement wherein:

the spiral portion of the heating element is surrounded by a plurality of layers of steel alternating with a plurality of layers of ceramic insulating material, the layers of steel including an outer layer and an inner layer, said inner layer being sprayed over an outer portion of the coils of the spiral portion of the heating element, the layers of steel other than the inner layer each being sprayed over an inner adjacent one of the layers of insulating material, the layers of insulating material each being sprayed over an inner adjacent one of the layers of steel.

2. An injection molding nozzle as claimed in claim 1 wherein the outer layer of stainless steel is substantially thicker than the inner layer of stainless steel.

3. An injection molding nozzle as claimed in claim 2 wherein the spiral portion of the electrical heating element is cylindrical shaped with the coils adjacent each other.

4. An injection molding nozzle as claimed in claim 2 wherein the body of the nozzle has a central cylindrical portion over which the coils of the spiral portion of the heating element are wound, the central portion of the body extending between a rear collar portion which extends outwardly adjacent the rear end and a forward collar portion which extends outwardly adjacent the forward end.

5. An injection molding nozzle as claimed in claim 3 further including a shoulder portion which is integrally brazed in place around a rear portion of the outer layer of steel adjacent the rear collar portion.

6. An injection molding nozzle as claimed in claim 1 wherein the outer layer of steel has a sprayed nickel coating.

7. An injection molding nozzle as claimed in claim 1 wherein the layers of steel are stainless steel.

8. An injection molding nozzle as claimed in claim 1 wherein the ceramic insulating material is alumina oxide.

* * * * *